United States Patent
Nishikawa et al.

[11] Patent Number: 5,917,599
[45] Date of Patent: Jun. 29, 1999

[54] LENS INCLINATION ADJUSTMENT SYSTEM USING AN INTERFEROMETER

[75] Inventors: Hiroshi Nishikawa; Toshiyuki Kase, both of Tokyo, Japan

[73] Assignee: Asahi Kogaku Kogyo Kabushiki Kaisha, Tokyo, Japan

[21] Appl. No.: 08/899,332

[22] Filed: Jul. 23, 1997

[30]  Foreign Application Priority Data

Jul. 24, 1996 [JP] Japan .................................. 8-194524

[51] Int. Cl.⁶ .................................................. G01B 9/02
[52] U.S. Cl. .......................................... 356/363; 356/358
[58] Field of Search ..................................... 356/346, 358, 356/359, 360

[56]  References Cited

U.S. PATENT DOCUMENTS

4,201,473  5/1980  Domenicali et al. .................... 356/360
4,537,473  8/1985  Maschmeyer ........................... 356/359
5,379,105  1/1995  Iki et al. .
5,432,606  7/1995  Noguchi et al. .
5,553,052  9/1996  Oono et al. .

*Primary Examiner*—Hoa Q. Pham
*Assistant Examiner*—Tu T. Nguyen
*Attorney, Agent, or Firm*—Greenblum & Bernstein P.L.C.

[57]  ABSTRACT

A lens inclination adjustment system includes an interferometer unit, an inclination adjusting unit and a data processing unit. The data processing unit compares data of the interference fringes generated by the interferometer with predetermined image data to determine inclination status of the lens. Thereafter, in the adjusting unit, the current inclination status of the lens is detected. The data processing unit then calculates a target position to which the inclination status of the lens should be adjusted, and displays a position indicating the current inclination status and the target position on a screen.

16 Claims, 7 Drawing Sheets

LENS INCLINATION ADJUSTMENT SYSTEM USING AN INTERFEROMETER

BACKGROUND OF THE INVENTION

The present invention relates to a lens inclination adjustment system for adjusting an inclination of a lens, and more particularly, to a lens inclination adjustment system for adjusting an inclination of an objective lens in an optical system of a data recording/reproducing device.

Conventionally, a data recording/reproducing device using an optical disk as a recording medium has been known. Such a device is provided with an optical system which includes a light source, an objective lens held in a lens holder. A recording medium (i.e., an optical disk) is set at a focal point of the objective lens. The light source emits a parallel light beam which is focused by the objective lens to form a beam spot on the recording medium. The beam reflects off the recording medium, and is received by an optical pick-up device.

In the data recording/reproducing device, an optical axis of the objective lens preferably intersects the recording medium at right angles because, if the optical axis inclines with respect to a normal line to the recording medium, coma occurs, which may cause the beam spot formed on the recording medium to be wider than it should be. If the beam spot is wider, a density of recording to the recording medium will be lower. Further, if the beam spot is wider, a reproduced signal may include noise.

Recently, a numerical aperture NA of the optical system for such a device has become larger. In the device which has an optical system having relatively great numerical aperture NA, even a small inclination of the objective lens may greatly affect the size of the beam spot.

Accordingly, it is necessary to adjust the inclination of the object lens such that an inclination angle formed between the optical axis of the objective lens and a line normal to the recording medium is within a permissible range. The permissible range is, for example, a range within 3 minutes.

In order to adjust the inclination of the objective lens, conventionally, a lens inclination adjustment system is used. The conventional inclination adjustment system includes an interferometer unit and a lens inclination adjustment unit.

Firstly, at least a part of the data recording/reproducing device including the optical system and the light source is coupled with the interferometer unit, and interference fringes are observed. A user may determine the inclination angle and inclination direction which is a direction of inclination from a plane parallel to the surface of the recording medium or the cover glass facing the objective lens, based on the observed interference fringes.

Next, the data recording/reproducing device is coupled with the lens inclination adjustment unit, and the lens is moved so that the inclination (i.e., the inclination angle and inclination direction) is adjusted to be in a permissible range in accordance with the inclination angle and the inclination direction determined by the user.

When the inclination of the objective lens is thus adjusted, the part of the data recording/reproducing device is coupled to the interferometer unit again and the interference fringes are observed again. Until the inclination of the objective lens falls within the permissible range, the above process of observing the interference fringe patterns, determining the inclination angle and the inclination direction of the objective lens and changing the inclination of the objective lens is repeated.

Accordingly, it takes a long time to adjust the inclination of the objective lens. Further, the inclination direction and the inclination angle may not be sufficiently precisely detected if the observation of the interference fringes are carried out by sight. In such a case, it may be difficult to adjust the inclination of the object lens to fall within a permissible range with use of the conventional lens inclination adjusting system even if the above-described process is repeated.

SUMMARY OF THE INVENTION

It is therefore an object of the present invention to provide a system with which the inclination of the objective lens of the data recording/reproducing device can be carried out precisely and quickly.

According to an aspect of the invention, there is provided a lens inclination adjustment system, comprising: an interferometer which generates an image of interference fringes representative of inclination of a lens with respect to a reference surface; a comparing system; formed between an optical axis of the lens and a line normal; a displaying system having a displaying screen; and a target indicating system. The comparing system determines an inclination angle and an inclination direction by comparing the image of interference fringes with a predetermined image. The inclination angle is an angle formed between an optical axis of the lens and a line normal to the reference surface. The target indicating system displays a current position on the screen representing a current orientation of the lens, and a destination area to which the position representative of the current orientation of the lens should be moved to be positioned. The target area is being determined based on the inclination angle, the inclination direction and the current position on the screen.

With this system, firstly, the inclination angle and direction are automatically detected. Secondly, the current status of inclination of the lens is displayed on the screen, and the destination is indicated on the screen. Since the inclination angle and direction automatically detected are used to determine the destination area, an accurate adjustment of the inclination of the lens can be achieved.

According to another aspect of the invention, there is provided a lens inclination adjustment system, comprising: an interferometer which generates an image of interference fringes representative of inclination of a lens with respect to a reference surface; a comparing system; formed between an optical axis of the lens and a line normal an inclination changing system which changes an inclination of the lens; a current inclination detecting system which detects a current inclination of the lens; a displaying system which has a screen and displays information regarding the current inclination of the lens as a position on the screen; and a calculating system. The calculating system calculates a target region relative to the position on the screen based on the inclination angle, the inclination direction and the current inclination of the lens. The target region is displayed on the screen. The comparing system determines an inclination angle and an inclination direction by comparing the image of interference fringes with a predetermined image. The inclination angle is an angle formed between an optical axis of the lens and a line normal to the reference surface. The position indicative of the current inclination of the lens moves on the screen as the inclination of the lens is changed with the inclination changing system. When the position is within the target region, the inclination of the lens is within a predetermined range.

Also with this system, the target region is automatically calculated with use of the inclination status which was detected with use of the interferometer, and an accurate position of the target region is displayed. Further, since the current inclination status and the target region are displayed on the same screen, adjustment of the inclination of the lens can be achieved precisely and easily.

Optionally, the displaying system includes a light source which emits a light beam towards the lens, and a light receiving system which receives a light beam that is emitted by the light source and reflected by the lens. The light receiving system outputs a signal representative of a beam received position at which the light beam is received. The beam received position is displayed on the screen as the position indicative of the current inclination of the lens. Since change of the inclination status of the lens is optically detected and displayed on the screen, inclination of the lens can be adjusted accurately.

Further, the calculating system includes a designating system which is operated to designate a position on the screen of the displaying system. The calculating system calculates the position of the target region based on the inclination angle, the inclination direction and the position designated by the designating system.

Before the lens is moved, the initial position of the lens is designated by a designating system so any change of the inclination of the lens can be traced correctly. It should be noted that the designating system includes, for example, a mouse pointer displayed on the screen and the mouse which moves the mouse pointer on the screen.

Optionally, the current inclination detecting system comprises: a light source which emits light to the lens along an optical axis of the lens from a predetermined side of the lens; an image receiving element having an image receiving surface, the image receiving element being provided at the predetermined side of the lens, said image receiving element receiving light reflected by the lens, the image receiving element outputting an image signal representing a received image; and a converging lens which is arranged on the predetermined side of the lens, between the lens and the light receiving element, to converge the light reflected by image lens on to the image receiving surface.

If the converging lens receives a beam having a relatively a large diameter, the beam waist on the image receiving surface has relatively a small size. In such a case, identification of the position indicative of the inclination status of the lens can be detected relatively easily.

Further, the displaying system receives the image signal output by the image receiving element and displays an image corresponding to the image signal.

Since an image indicative of the inclination status of the lens is displayed on the screen simultaneously as it changes, the user can adjust the inclination of the lens easily.

Furthermore, the lens is provided with a light reflecting portion. In particular, the light reflecting portion is a flange portion formed on a periphery of the lens. Preferably, the light source project a light beam onto an entire portion of the flange portion. With this arrangement, as described above, a relatively small image indicative of the position of the lens is obtained and displayed on the screen, which enables the user to adjust the inclination of the lens easily.

Alternatively, the calculating system may include an inputting system which is used to input a current inclination status of the objective lens. Specifically, the inputting system may include a mouse. By operating the mouse, a mouse pointer displayed on a screen of the displaying system is moved, and by clicking a mouse button, the current inclination status of the object lens can be input as a two-dimensional position on the screen of the displaying system.

According to a further aspect of the invention, there is provided a lens inclination adjustment system, comprising: an interferometer; a comparing system; an inclination changing system which changes an inclination status of the lens; a current inclination detecting system which detects a current inclination status of the lens; a displaying system; and a calculating system. The interferometer generates an image of interference fringes representative of inclination of a lens with respect to a reference surface. The comparing system determines an inclination angle and an inclination direction to be changed for adjusting the inclination of the lens by comparing the image of interference fringes with a predetermined image which corresponds to an image of interference fringes when the inclination of the lens is adjusted. The displaying system has a screen and displays information regarding the current inclination status of the lens as a position on the screen. The calculation system calculates a target position on the screen based on the inclination angle, the inclination direction and the position indicative of the current inclination status of the lens. The position on the screen indicative of the current inclination status of the lens is updated simultaneously as the inclination status is changed with the inclination changing system.

According to another aspect of the invention, there is provided a lens inclination adjusting system including a data recording/reproducing device using a disk-shaped recording medium, an interferometer and a lens inclination adjustment unit. The recording/reproducing device comprises: a spindle motor, the recording medium being mounted on the spindle motor and rotated; an objective lens; and a head on which the objective lens is mounted. The head is movable in a predetermined direction which is a substantially radial direction of the disk-shaped recording medium so that the head is located closer to or apart from the spindle motor. The interferometer and the lens inclination adjustment unit are arranged in a direction parallel to the predetermined direction. The head is positioned to face either of the interferometer or the lens inclination adjustment unit. The head is moved in the predetermined direction and positioned to face the interferometer when an inclination of the objective lens with respect to the recording medium is detected. The head is positioned to face the lens inclination adjustment unit when the inclination of the objective lens is adjusted. With this construction, since the head of the object lens is movable inside the data recording/reproducing device, and the interferometer and the inclination adjustment device are simultaneously mounted on the data recording/reproducing device, by moving only the head, measurement of the inclination of the objective lens and adjustment of the inclination can be done without moving the entire device.

Optionally, the interferometer is arranged closer to the spindle motor than the lens inclination adjustment unit. In order to observe the inclination status of the objective lens, a reference surface should be provided within the optical path inside the interferometer. If the interferometer is located on the spindle motor side, by placing a disk-shaped member having a reference surface on the spindle motor instead of the disk-shaped recording medium, the reference surface can be obtained. Further, if the disk-shaped member has an appropriate size, the inclination adjustment operation does not interfere with use of the lens inclination adjustment unit.

DESCRIPTION OF THE PREFERRED EMBODIMENT

A lens inclination adjustment system according to an embodiment of the invention is described.

Figure 1:
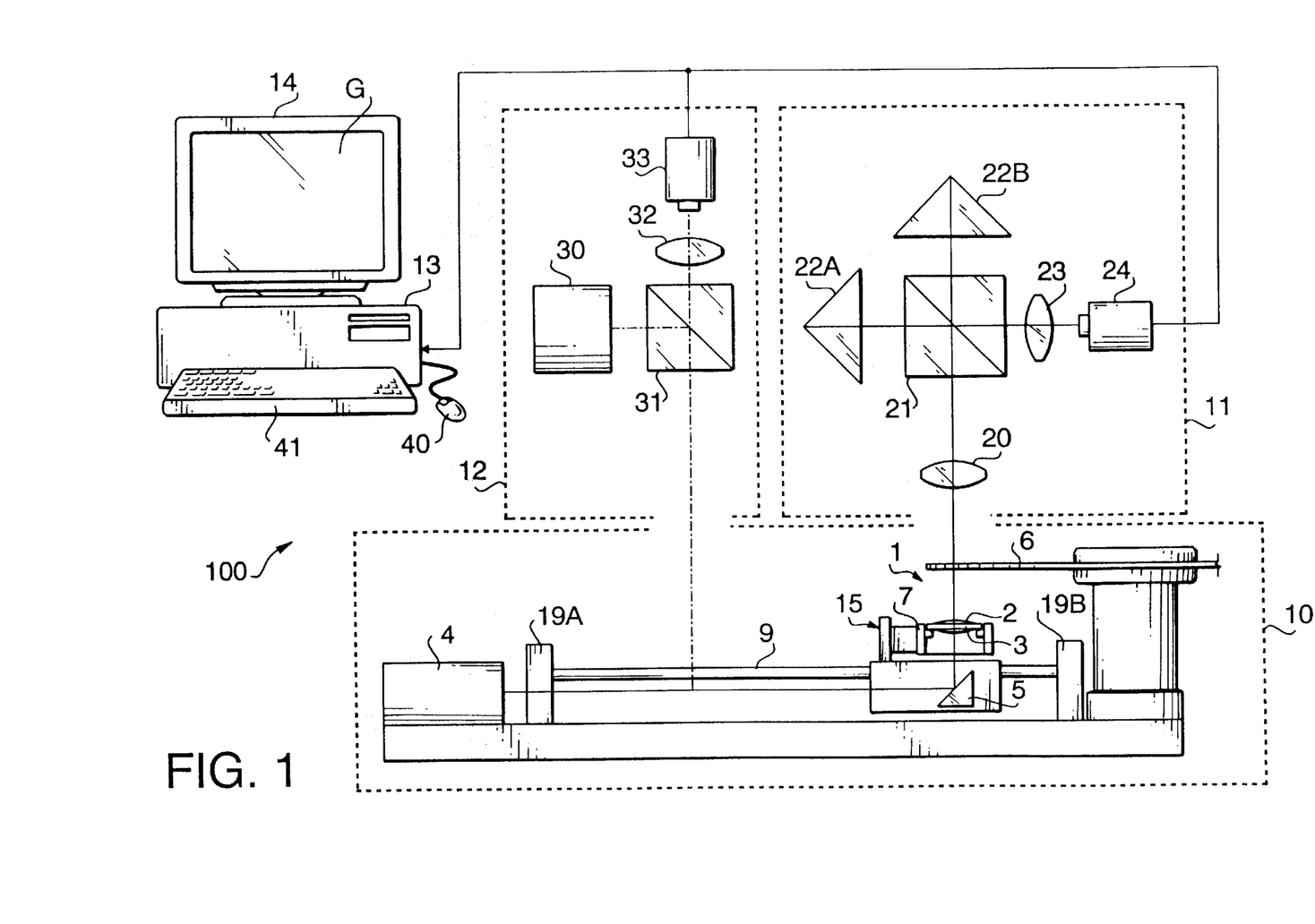
FIG. 1 is a diagram showing an arrangement of a lens adjusting system.

FIG. 1 is a diagram illustrating a schematic structure of an inclination adjustment system 100. The lens inclination adjustment system 100 includes a data recording/reproducing device 10 which uses an optical disk, an interferometer unit 11 to be coupled with the data recording/reproducing device 10, an inclination adjusting unit 12 which is also coupled to the data recording/reproducing device 10 and used for changing the inclination of an objective lens of the data recording/reproducing device 10, and a data processing device 13 such as a personal computer or the like. The data processing device 13 includes a display 14, a keyboard 41 and a mouse 40.

The data recording/reproducing device 10 is provided with an optical system which includes a light source 4, a pair of rail members 9 ends of which are supported by a pair of rail supports 19A and 19B. Further, an optical head 15 is slidably supported by the pair of rail members 9. The optical head 15 is movable within a movable range, which is a range between the pair of rail supports 19A and 19B, along the rail 9, and includes an objective lens 1, a lens holder 7 on which the objective lens 1 is mounted, and a mirror 5.

When the inclination of the objective lens 1, with respect to the recording medium is determined, as described below, a cover glass 6 is placed in a position in which a recording medium (e.g., an optical disk) would normally be placed in the data recording/reproducing device 10.

Figure 4A:
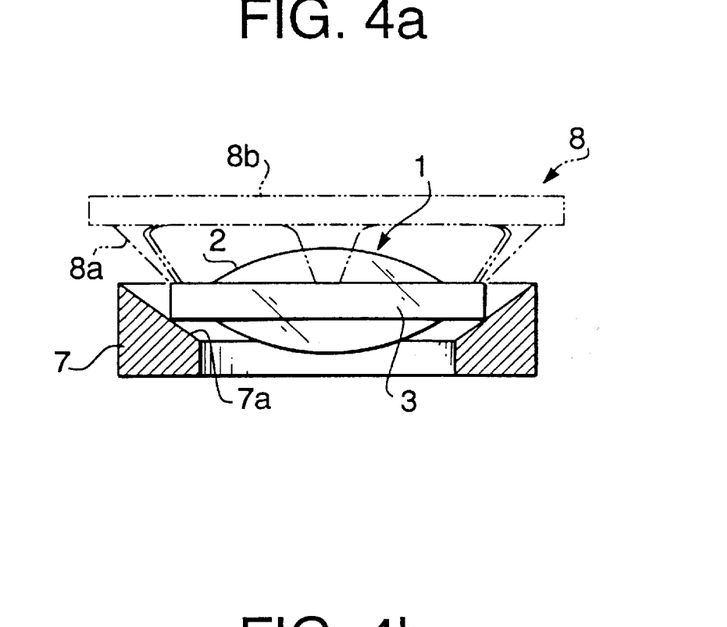
FIG. 4a is a side view of a objective lens, a lens holder and a jig used for adjusting the inclination of the lens.

As shown in FIG. 4a, the objective lens 1 includes a central lens portion 2, and a flat portion 3 which encircles a circumference of the lens portion 2. An outer edge of the flat portion 3 is supported on a sloping surface 7a of the lens holder 7. After the inclination of the objective lens is adjusted, the objective lens is fixedly secured on the sloping surface with adhesive agent. In this embodiment, a UV (ultraviolet) hardening adhesive agent is utilized. The UV hardening adhesive agent initially has a certain viscosity, and when illuminated with a UV light, it hardens. In practice, firstly the lens is placed on the sloping surface 7a with the UV hardening adhesive agent applied, and the inclination is adjusted. After the inclination is adjusted, the UV light is projected to the lens holder 7 so that the UV hardening adhesive agent is hardened and the object lens is fixedly secured.

Referring again to FIG. 1, the interferometer unit 11 includes a collimating lens 20, a beam splitter 21, corner-cube reflectors 22A and 22B, an imaging lens 23, and a CCD (charge coupled device) 24. The interferometer unit 11 is used for observing interference fringes of an incident light beam. The inclination direction and the inclination angle θ are determined based on the observed interference fringes.

The inclination adjusting unit 12 is used to adjust the inclination of the objective lens, and includes a light source 30, a beam splitter 31, a collimating lens 32, a CCD (charge coupled device) 33, and an adjusting device (described later).

The data processing device 13 is connected with the CCD's 24 and 33. Image signals are transmitted from the CCD's 24 and 33 to the data processing device 13, and then displayed on a screen G of the display 14.

Adjustment of the inclination of the objective lens 2 with use of the lens inclination adjustment system 100 is now described.

Figure 2:
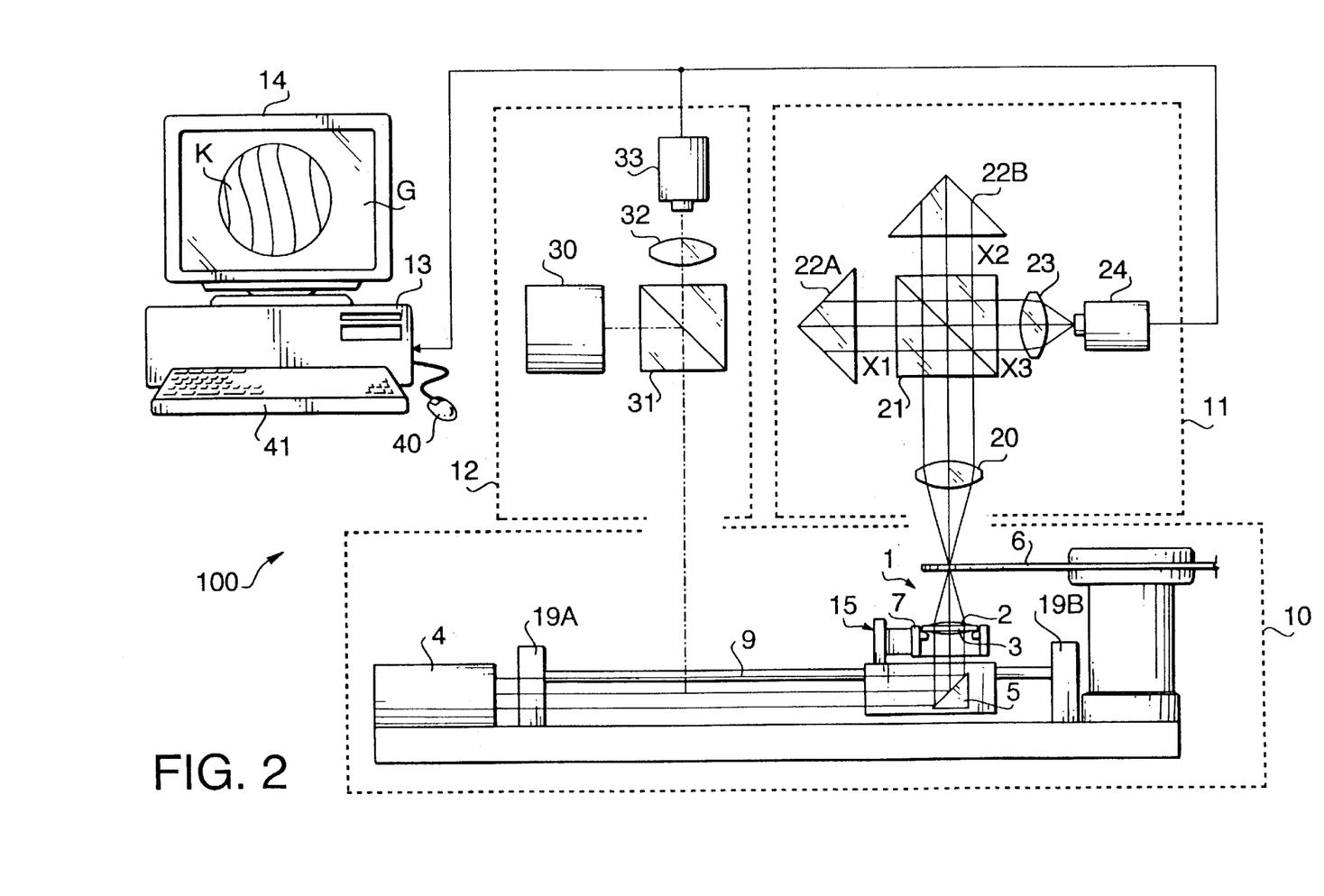
FIG. 2 is a diagram of a lens adjusting system wherein interference fringes are observed.

The interferometer 11 is coupled to the data recording/reproducing device 10 with use of a coupling structure (not shown). Then, the optical head 15 is first located at a position where the object lens 1 faces the interferometer unit 11, as shown in FIG. 2. In accordance with the interference fringes formed by the interferometer unit 11, the inclination angle θ between the axis of the beam incident on the cover glass 6 and the line normal to the cover glass 6, and the inclination direction are determined.

Figure 3:
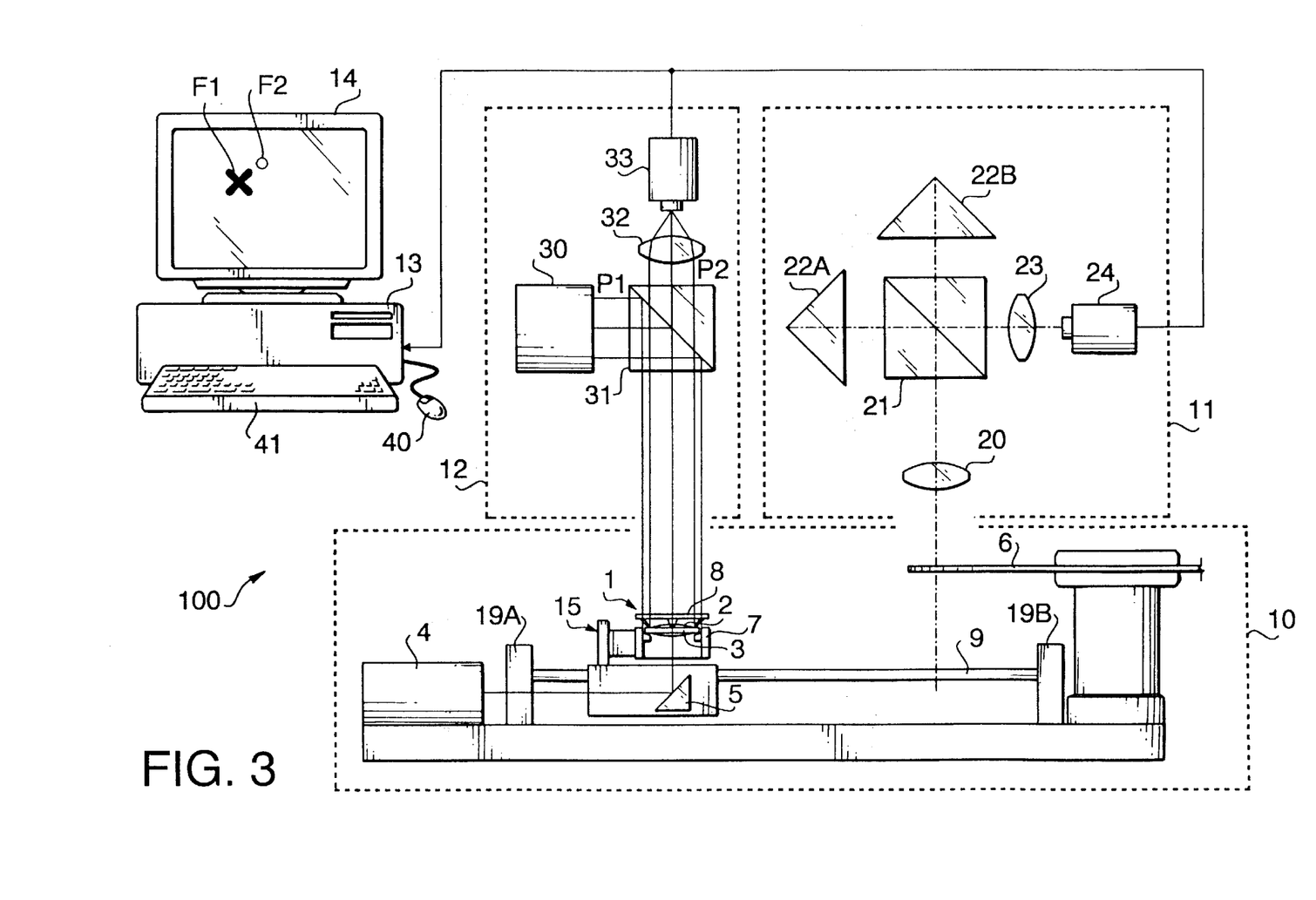
FIG. 3 is a diagram of a lens adjusting system wherein an inclination of an objective lens is adjusted.

If the inclination angle θ is greater than a predetermined threshold value (e.g., 3 minutes), the optical head 15 is then moved to the other side of its movable range so that the object lens 1 faces the inclination adjusting unit 12, as shown in FIG. 3. The inclination of the objective lens 1 is then adjusted, based on the inclination angle θ and the inclination direction with use of the adjusting device. This process is repeated until the inclination angle θ is below the predetermined threshold value. When the inclination of the objective lens is finished, the objective lens is secured in place using an adhesive or the like.

Figure 6:
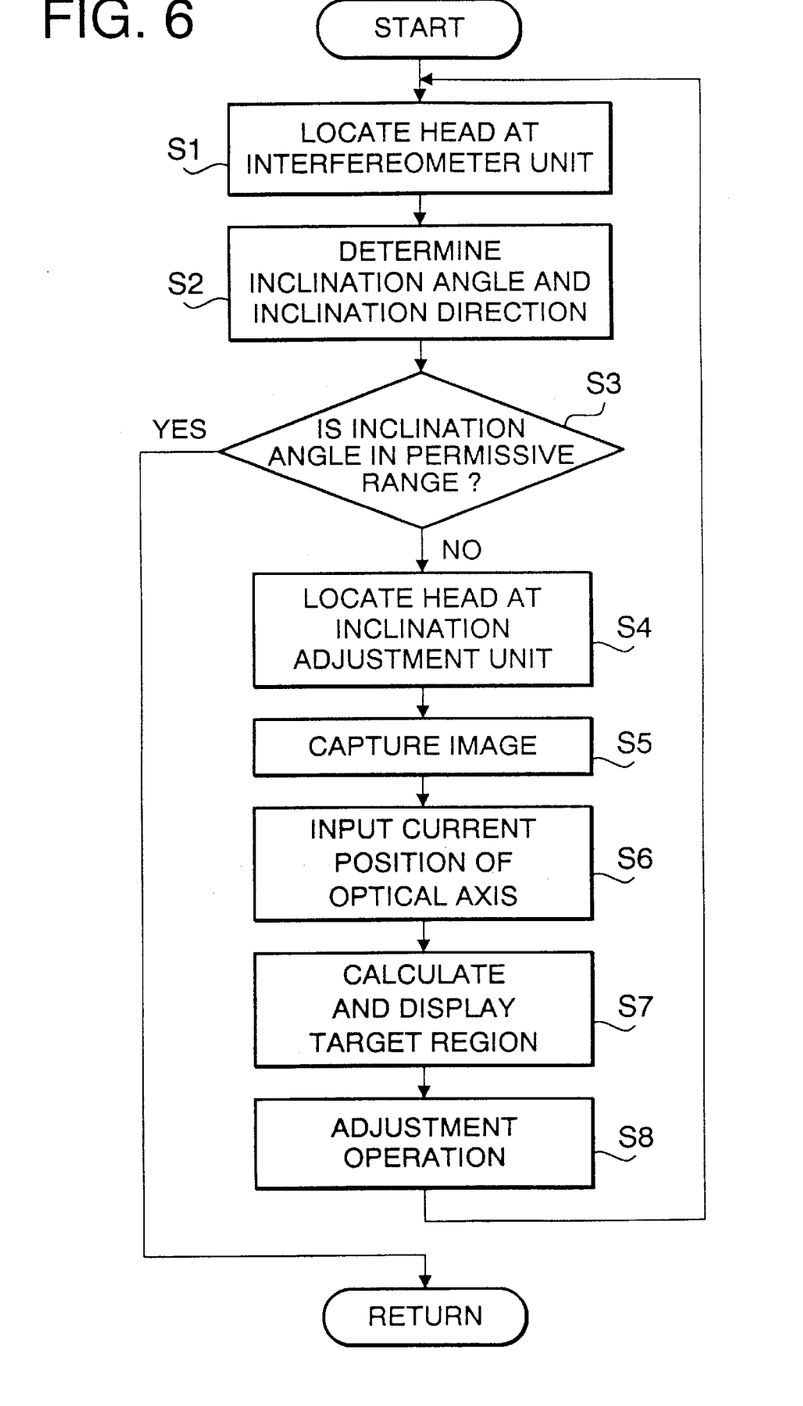
FIG. 6 is a flowchart illustrating a process of adjusting the inclination of the objective lens.

A detailed process for determining the inclination angle θ and adjusting the inclination of the optical axis of the objective lens 1 is now described with reference to FIG. 6.

The objective lens 2 is mounted on the lens holder 7 with the UV hardening adhesive applied on the sloping surface 7a. Then, in step S1, the optical head 15 is located to face the interferometer unit 11, as shown in FIG. 2. A light beam emitted from the light source 4, is reflected on the mirror 5, and is focused by the objective lens 1 onto the cover glass 6. The focused light beam passes through the cover glass 6 and is collimated by the collimating lens 20 to be a parallel beam X.

In particular, the cover glass 6 is set in place of the recording medium, such as an optical disk or the like, to emulate a transparent layer of an optical disk. That is, since the optical disk has a transparent layer covering a surface where the focused beam reflects, and in operation the focused beam passes through the transparent layer, before reflecting on the data layer and passing back through the transparent layer the cover glass 6 is arranged to simulate the transparent layer of the optical disk.

The parallel beam X is divided by the beam splitter 21 into divided parallel beams X1 and X2. The divided parallel beams X1 and X2 reflect on the corner-cube reflectors 22A and 22B back to the beam splitter 21. The divided parallel beam X1 reflected by the corner-cube reflector 22A passes through the beam splitter 21 and directed to the lens 23. The divided parallel beam X2 passed through the beam splitter 21 is reflected by the corner-cube reflector 22B and then reflected by the beam splitter 21 towards the lens 23. The divided parallel beams X1 and X2 are converged by the converging lens 23 so that the interference fringes K are formed on the CCD 24. The CCD 24 outputs an image signal to the data processing device 13 and an image of the interference fringes K is displayed on the screen G of the display 14.

In this case, positions of the collimating lens 20, the beam splitter 21, and the corner-cube reflectors 22A and 22B are adjusted in relation to the cover glass 6. Accordingly, if the optical axis of the objective lens 1 is perpendicular to the cover glass 6, the interference fringes K are not distorted.

In step S2, the data processing device 13 calculates the inclination angle θ and inclination direction. Specifically, the data processing device 13 compares the signal output from the interferometer unit 11 (the CCD 24) with a reference signal pre-stored in a memory (not shown) of the data processing device 13, and calculates the inclination direction and the inclination angle θ based on the comparison result. The calculated inclination direction and the inclination angle θ are stored in the memory of the data processing device 13, and will be used for generating a vector data representing the inclination direction and the inclination angle θ of the objective lens 1.

In step S3, the data processing device 13 then compares the inclination angle θ with the predetermined threshold value (e.g., 3 minutes) to determine whether the inclination angle θ is within a permissible angle range at step S2. If the inclination angle θ is out of the permissible range (NO at step S3), the inclination of the objective lens 2 is adjusted in the following steps S4–S8.

Firstly, the light source 4 is turned OFF, and the optical head 15 is moved to the position at which the optical head 15 faces the inclination adjusting unit 12 at step S4, as shown in FIG. 3. In this case, shock applied to the objective lens 1 is relatively small, and accordingly the objective lens 1 may not change its inclination on the lens holder 7.

Figure 4B:
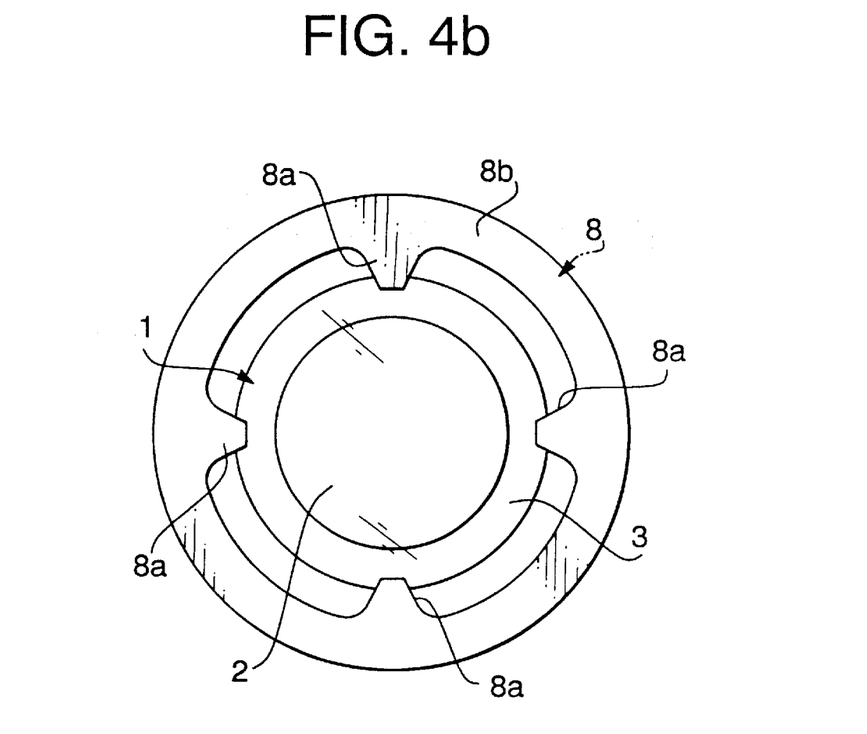
FIG. 4b is a top view of the lens and the jig.

When the inclination is to be changed, as shown in FIGS. 4a and 4b, a jig 8 is placed on the objective lens 1. The jig 8 includes a pick 8a and a mirror surface 8b. The pick 8a abuts the flat portion 3 of the objective lens 1 and the inclination of the objective lens 1 is adjusted by known operation of the jig 8. A mechanism for adjusting the inclination of the objective lens 1 is disclosed in U.S. Pat. No. 5,553,052, teachings of which are incorporated herein by reference.

FIG. 3 shows a condition in which the optical head 15 is positioned to face the inclination adjusting unit 12.

At step S5, the light source 30 is driven to emit a light beam P1 which has a slightly larger diameter in cross section than a diameter of the objective lens 1. The light beam P1 reflects on the beam splitter 31 toward the objective lens 1. The flat portion 3 of the objective lens 1 and the mirror surface 8b of the jig 8 reflect a part of the beam P1. A reflected beam P2 (i.e., the beam reflected by the flat portion 3 of the objective lens 1 and the mirror surface 8b of the jig 8) passes through the beam splitter 31, and is focused by the converging lens 32 on the CCD 33, which outputs an image signal to the data processing device 13. Thus, an image of the reflected beam P2 focused on the CCD 33 is displayed on the screen G of the display 14.

Figure 5A:
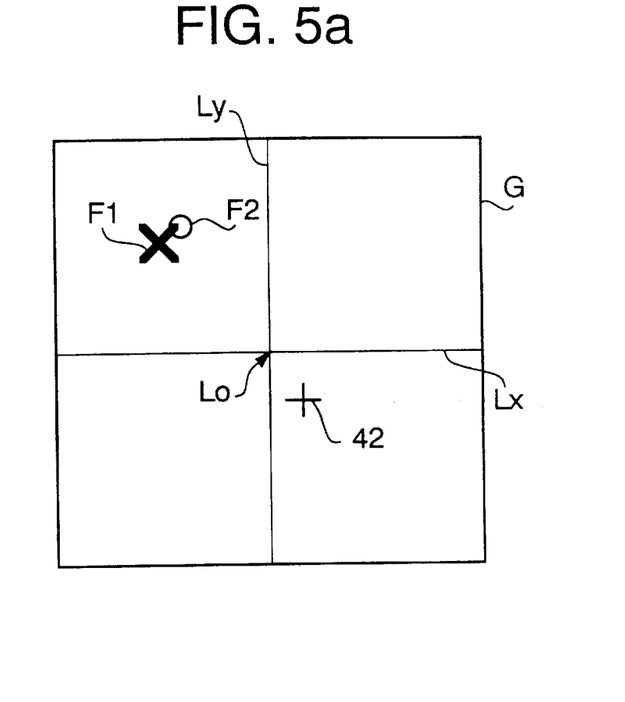
FIG. 5a shows a screen image of a reflected beam.

FIG. 5a shows the image displayed on the screen G of the monitor 14, corresponding to the reflected beam P2.

A first figure F1 represents an image corresponding to the flat portion 3 of the objective lens 1; and a second figure F2 represents an image corresponding to the mirror surface 8b.

A center of the first figure F1 corresponds to the optical axis of the objective lens 1. The second figure F2 is to be ignored since the second figure F2 does not correspond to the optical axis of the objective lens 1.

As described above, the diameter of the beam P1 is relatively great with respect to the diameter of the objective lens 1 so that a beam reflected by the entire area of the flat portion 3 of the objective lens 1 is incident to the lens 32.

It is known that the diameter of the beam waist ωo is expressed as follows:

$$\omega 0 = \lambda f / \pi \omega$$

where, λ is a wavelength of the beam, f is the focal length of the lens (in this case, the lens 32), and ω is the diameter of the beam incident to the lens. As understood from the formula above, if the diameter 0) of the incident beam is larger, the diameter of the beam waist coo is smaller. It is further known that, if the central area, in cross section, of the incident beam is obscured, the beam waist becomes smaller.

In the present embodiment, since the beam P1 is projected to the entire surface of the flat portion 3 of the objective lens 1, the beam reflected on the flat portion 3 and incident to the lens 32 has a relatively great diameter. Further, since the beam incident to the lens 32 is the beam reflected by the flat portion 3 of the objective lens 1, the central portion thereof is obscured. Accordingly, the size of the spot formed on the CCD 33, i.e., the figure F1 is relatively small. For a similar reason, the size of the figure F2 is also small. It should be noted that the beam projected and reflected on the lens portion 2 diverges due to the concave shape of the lens portion 2 and does not substantially affect the image formed on the CCD 33. Further, since the beam reflected on the flat portion 3 at the portions between the picks 8a and directed to the edges of the portions of the jig 8 diverge in directions parallel to diameters connecting the opposite portions between the picks 8a, the figure F1 is formed to be X-shaped.

Furthermore, the first figure F1 as shown in FIG. 5a still extends across about 10 minutes of arc. However, since a part of the parallel beam P1 is shaded by the pick 8a and diffracted, a center region of the first figure F1 is brighter within a range of about 2 minutes of the arc. Accordingly, it is relatively easy to identify the center of the first figure F1.

Lines Lx and Ly displayed on the screen G represent axes of the inclination adjusting unit 12, and LO is an origin of Lx–Ly coordinates. In this embodiment, the cursor pointer 42 is shown as a small cross.

Figure 5B:
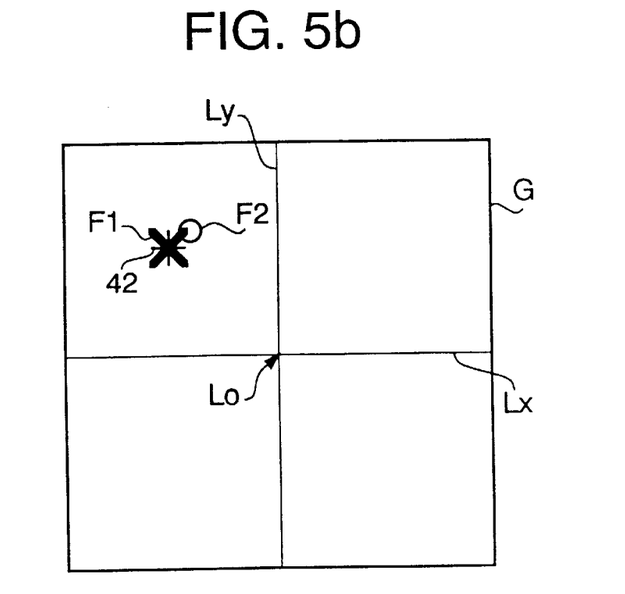
FIG. 5b shows a screen image of a reflected beam when the current inclination of the lens is input.

At step S6, the operator is required to locate the cursor pointer 42 on the center of the first figure F1, and to click a mouse button (not shown) to input the position of the first figure F1 on the screen G (see FIG. 5b). Since the center of the first figure F1 represents the optical axis of the objective lens 1, the data processing device 3 calculates a target position based on the position of the first figure F1 on the screen G and the data representing the inclination direction and inclination angle which were obtained at S2 with use of the interferometer unit 11. Preferably the cursor pointer 42 is moved with use of the mouse 40, and the position is input by clicking the mouse button (not shown). Alternatively, the keyboard 41 or some other input device may also be used, if available.

Figure 5C:
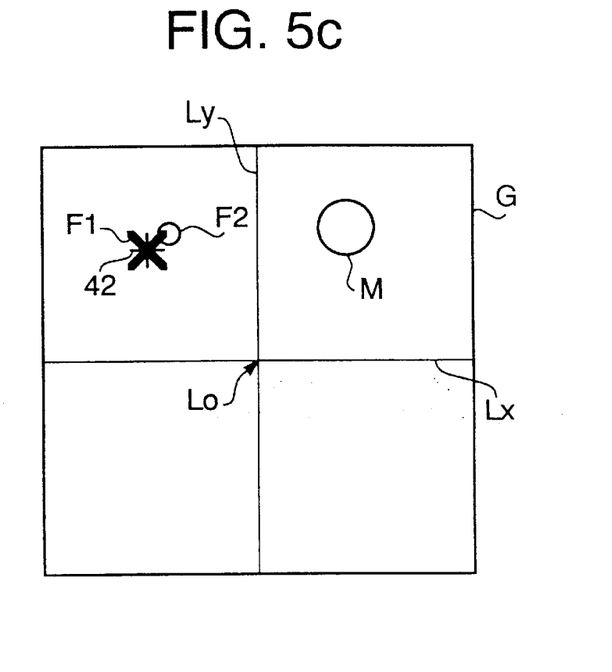
FIG. 5c shows a screen image of a target region which is referred to for adjusting the inclination of the lens.

In Step S7, the data processing device 13 calculates the position of the target region M based on the inclination direction, and inclination angle θ. Specifically, the data processing device 13 calculates the position of the target region M on the screen G, based on the vector data stored in the memory at steps S2, and the position of the center of the first figure F1 input in S6, and displays the target region M on the screen G as shown in FIG. 5c. As described briefly above, the target region M corresponds to the permissible range of the inclination angle θ, that is, the area in which the inclination angle θ is less than the predetermined threshold value (e.g., 3 minutes). Thus, if the center of the first figure F1 is moved into the target region M by changing the inclination of the objective lens 1, the inclination angle θ will be such that the data recording/reproducing device 10 can correctly record and/or reproduce data.

Figure 5D:
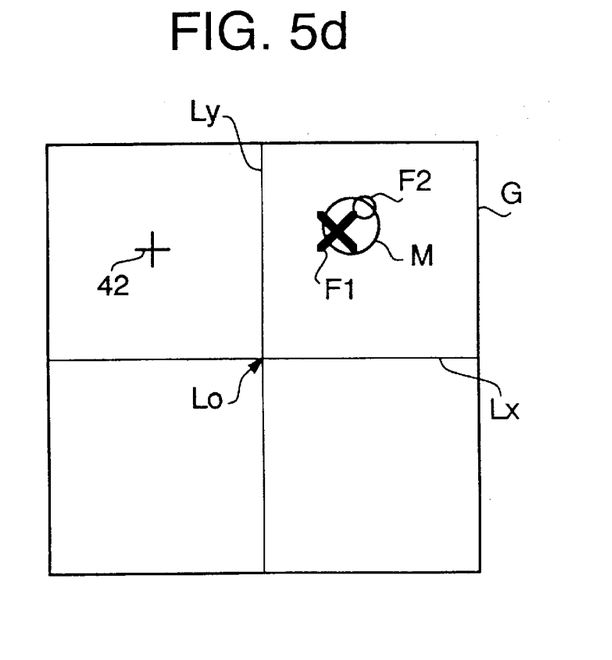
FIG. 5d shows a screen image when the lens position has been adjusted.

In step S8, the operator manipulates the inclination adjusting unit 12 to adjust the inclination of the optical axis such that the first figure F1 is moved into the target region M on the screen G of the display 14. Note that the jig 8 may slip on the objective lens 1, and the objective lens 1 may not move even if the jig 8 is moved to change the inclination of the objective lens 1. In order for the operator to ensure that the jig 8 and the objective lens 1 are both moved, it is preferable to monitor the movement of the jig 8. In the embodiment, the second figure F2 represents the inclination of the jig 8, and accordingly, the operator can adjust the inclination of the objective lens 1 while monitoring the inclination status of both the objective lens 1 and the jig 8.

After step S8, the light source is turned OFF, the jig 8 is detached from the objective lens 1, and the optical head 15 is located at the position where it faces the interferometer unit 11 again (S1).

Thereafter, similar to the above, the interference fringes K are captured again as in step S2, and it is determined whether the inclination angle θ is out of the predetermined permissible range by comparing the data of the captured interference fringes with the pre-stored data (S2).

If the inclination angle θ is within the permissive range (i.e., within 3 minutes) (YES at S3), the adjustment of the optical axis is finished. Then, the optical head 15, especially, the portion where the objective lens 1 is supported on the sloping portion 7a is illuminated by the UV light. Thus the UV hardening adhesive is hardened, and accordingly, the objective lens 1 is fixed in the lens holder 7.

In the above mentioned description, a precise adjustment of the optical axis of the objective lens 1 is expected.

Further, since the optical head 15 is movable inside the data recording/reproducing device 10, and the interferometer 11 and the inclination adjusting unit 12 are simultaneously coupled to the data recording/reproducing device 10, only by moving the optical head 11 along the rail members 9, measurement of the inclination of the objective lens 1, and adjustment of the inclination can be done without moving the entire device as has been done in the conventional system.

Optionally, the interferometer 11 is arranged closer to the spindle motor than the lens inclination adjusting unit 12. In order to observe the inclination status of the objective lens 1, a reference surface should be provided within the optical path inside the interferometer 11. Since the interferometer 11 is located on the spindle motor side, by placing a cover plate 6 having a reference surface on the spindle motor instead of the disk-shaped recording medium, the reference surface can be provided. Further, if the cover plate 6 has an appropriate size, the inclination adjustment operation does not interfere with use of the lens inclination adjusting unit 12, as shown in FIG. 3.

Although the system for adjusting an optical axis of a lens is described herein with respect to the preferred embodiments, many modifications and changes can be made without departing from the spirit and scope of the invention.

The present disclosure relates to subject matter contained in Japanese Patent Application No. HEI 08-194524, filed on Jul. 24, 1996, which is expressly incorporated herein by reference in its entirety.

What is claimed is:

1. A lens inclination adjustment system, comprising:

an interferometer which generates an image of interference fringes representative of inclination status of a lens with respect to a reference surface;

a comparing system which determines an inclination angle and an inclination direction by comparing said image of interference fringes with a predetermined image, said inclination angle being an angle formed between an optical axis of said lens and a line normal to said reference surface;

a display system having a displaying screen;

a target indicating system which displays a current position on said screen representing a current orientation of said lens, and a target area to which said position representative of said current orientation of said lens should be moved, said target area being determined based on said inclination angle, said inclination direction and said current position on said screen.

2. A lens inclination adjustment system, comprising:

an interferometer which generates an image of interference fringes representative of inclination of a lens with respect to a reference surface;

a comparing system which determines an inclination angle and an inclination direction by comparing said image of interference fringes with a predetermined image, said inclination angle being an angle formed between an optical axis of said lens and a line normal to said reference surface;

an inclination changing system which changes an inclination of said lens;

a current inclination detecting system which detects a current inclination of said lens;

a displaying system which has a screen and displays information regarding said current inclination of said lens as a position on said screen;

a calculating system which calculates an angle and a direction of inclination of said lens to be changed for adjusting the inclination of said lens based on said inclination angle, said inclination direction and said current inclination of said lens;

wherein said displaying system displays a target region representative of a position when said inclination of said lens is adjusted on said screen, and wherein said position indicative of said current inclination of said lens moves on said screen as the inclination of said lens is changed with said inclination changing system.

3. The lens inclination adjustment system according to claim 2, wherein said displaying system includes:

a light source which emits a light beam towards said lens;

a Light receiving system which receives a light beam that is emitted by said light source and reflected by said lens, said light receiving system outputting a signal representative of a beam received position at which said light beam is received, said beam received position being displayed on said screen as said position indicative of the current inclination of said lens.

4. The lens inclination adjustment system according to claim 3, wherein said calculating system includes a designating system which is operated to designate a position on said screen of said displaying system, said calculating system calculating said position of said target region based on said inclination angle, said inclination direction and said position designated by said designating system.

5. The lens inclination adjustment system according to claim 2, wherein said current inclination detecting system comprises:

a light source which emits light to said lens along an optical axis of said lens from a predetermined side of said lens;

an image receiving element having an image receiving surface, said image receiving element being provided at said predetermined side of said lens, said image receiving element receiving light reflected by said lens, said image receiving element outputting an image signal representing a received image; and a converging lens which is arranged on said predetermined side of said lens, between said lens and said image receiving element, to converge said light reflected by said lens on to said image receiving surface.

6. The lens inclination adjustment system according to claim 5, wherein said displaying system receives said image signal output by said image receiving element and displays an image corresponding to said image signal.

7. The lens inclination adjustment system according to claim 5, wherein said lens is provided with a light reflecting portion.

8. The lens inclination adjustment system according to claim 7, wherein said light reflecting portion is a flange portion formed on a periphery of said lens.

9. The lens inclination adjustment system according to claim 8, wherein said light source project a light beam onto an entire portion of said flange portion.

10. The lens inclination adjustment system according to claim 6, wherein said calculating system includes an inputting system which is used to designate a current inclination status of said objective lens.

11. The lens inclination adjustment system according to claim 10, wherein said inputting system includes a mouse which is operated to designate said current inclination status as a position on the screen of said displaying system.

12. A lens inclination adjustment system, comprising:

an interferometer which generates an image of interference fringes representative of inclination of a lens with respect to a reference surface;

a comparing system which determines an inclination angle and an inclination direction to be changed for adjusting said inclination of said lens by comparing said image of interference fringes with a predetermined image which corresponds to an image of interference fringes when said inclination of said lens is adjusted;

an inclination changing system which changes an inclination status of said lens;

a current inclination detecting system which detects a current inclination status of said lens;

a displaying system which has a screen and displays information regarding said current inclination status of said lens as a position on said screen;

a calculating system which calculates a target position on said screen based on said inclination angle, said inclination direction and said position indicative of said current inclination status of said lens, wherein said position on said screen indicative of said current inclination status of said lens is updated simultaneously as said inclination status is changed with said inclination changing system.

13. A lens inclination adjusting system including a data recording/reproducing device using a disk-shaped recording medium, an interferometer and a lens inclination adjustment unit, wherein said recording/reproducing device comprises:

a spindle motor, said recording medium being mounted on said spindle motor and rotated;

an objective lens; and a head on which said objective lens is mounted, said head being movable in a predetermined direction which is a substantially radial direction of said disk-shaped recording medium so that said head is located closer to or further from said spindle motor, wherein said interferometer and said lens inclination adjustment unit are arranged in a direction parallel to said predetermined direction, said head being positioned to face one of said interferometer and said lens inclination adjustment unit, and wherein said head is moved in said predetermined direction and positioned to face said interferometer when an inclination of said objective lens with respect to said recording medium is detected, and wherein said head is positioned to face said lens inclination adjustment unit when said inclination of said objective lens is adjusted.

14. The lens inclination adjusting system according to claim 13, wherein said interferometer is arranged closer to said spindle motor than said lens inclination adjustment unit.

15. The lens inclination adjusting system according to claim 13, further comprising a comparing system which determines an inclination angle and inclination direction by comparing an image of interference fringes with a predetermined image, the inclination angle being an angle formed between an optical axis of the objective lens and a line normal to a reference surface.

16. A lens inclination adjustment method comprising:

generating an image of interference fringes representing an inclination of a lens with respect to a reference surface;

determining an inclination angle and an inclination direction by comparing the image of interference fringes with a predetermined image, the inclination angle being an angle formed between an optical axis of the lens and a line normal to the reference surface;

changing an inclination of the lens;

detecting a current inclination of the lens;

displaying information regarding the current inclination of the lens as a position on a display screen;

calculating an angle and a direction of inclination of the lens to be changed for adjusting the inclination of the lens based on the inclination angle, the inclination direction and the current inclination of the lens; and displaying a target region representing a position when the inclination of the lens is adjusted on the display screen;

wherein the position indicating the current inclination of the lens moves on the display screen as the inclination of the lens is changed with the inclination changing system.

* * * * *